(12) United States Patent
Fishman

(10) Patent No.: US 6,223,923 B1
(45) Date of Patent: May 1, 2001

(54) LOCKABLE SAFETY RELEASE GAS CAP

(76) Inventor: Joseph Fishman, 120A Silver Star Blvd., Scarborough (CA), M1V 4V8

(*) Notice: Subject to any disclaimer, the term of this patent is extended or adjusted under 35 U.S.C. 154(b) by 0 days.

(21) Appl. No.: 09/024,186

(22) Filed: Feb. 17, 1998

(51) Int. Cl.$^7$ ............................. B65D 51/16; B65D 55/14
(52) U.S. Cl. ............................. 220/210; 70/173; 70/221; 220/86.2; 220/203.22; 220/231; 220/746
(58) Field of Search .................................... 220/210, 212, 220/582, 203.19, 203.29, 231, 745, 746, 86.1, 86.2, 86.3, 89.1, 203.22; 296/97.22; 70/221, 258, 173, 170, 171; 292/169

(56) References Cited

U.S. PATENT DOCUMENTS

| | | |
|---|---|---|
| Re. 27,303 | 3/1972 | Durso et al. . |
| Re. 27,307 | 3/1972 | De Lalio . |
| 1,453,299 | 5/1923 | Wetzel . |
| 1,847,117 | 3/1932 | Lantero . |
| 1,985,787 | 12/1934 | LeBourveau . |
| 2,010,200 | 8/1935 | Rufener et al. . |
| 2,437,674 | 3/1948 | Armbruster . |
| 2,679,946 | 6/1954 | Friend . |
| 2,793,777 | 5/1957 | Lewis . |
| 2,867,342 | 1/1959 | Baars et al. . |
| 3,682,343 | 8/1972 | Landen . |
| 3,703,245 | 11/1972 | Brewer . |
| 3,735,887 | 5/1973 | Morris . |
| 3,856,316 | 12/1974 | Badberg . |
| 3,907,155 | 9/1975 | Smith et al. . |
| 3,915,335 * | 10/1975 | Shanklin et al. ...................... 220/210 |
| 3,937,357 * | 2/1976 | Burgess ............................ 220/203.26 |
| 3,938,692 | 2/1976 | Crute . |
| 3,945,454 | 3/1976 | Kinoshita et al. . |
| 3,998,078 | 12/1976 | Detwiler . |
| 4,000,632 * | 1/1977 | Summan ............................... 220/210 |
| 4,000,633 * | 1/1977 | Evans ................................ 220/203.26 |
| 4,013,191 | 3/1977 | Gerdes . |
| 4,036,399 | 7/1977 | Gerdes . |
| 4,049,152 | 9/1977 | Treanor . |
| 4,053,083 * | 10/1977 | Hukuta .................................. 220/210 |
| 4,142,756 | 3/1979 | Henning et al. . |
| 4,162,021 * | 7/1979 | Crute .................................... 220/202 |
| 4,177,931 | 12/1979 | Evans . |
| 4,223,794 | 9/1980 | Morris . |
| 4,231,489 | 11/1980 | Malone . |
| 4,267,858 | 5/1981 | Lewis . |
| 4,271,976 | 6/1981 | Detwiler . |
| 4,280,347 | 7/1981 | Evans . |
| 4,299,102 * | 11/1981 | Aro ...................................... 220/210 |
| 4,358,023 | 11/1982 | Fukuta . |
| 4,436,219 | 3/1984 | Reutter . |
| 4,453,388 * | 6/1984 | Baker et al. ...................... 220/210 X |
| 4,458,824 | 7/1984 | Baker et al. . |
| 4,465,202 | 8/1984 | Stove et al. . |
| 4,466,550 | 8/1984 | Sullivan . |

(List continued on next page.)

FOREIGN PATENT DOCUMENTS

| | | |
|---|---|---|
| 20 14 130 | 3/1970 | (DE) . |
| 26 57 747 A1 | 12/1976 | (DE) . |
| 947882 | 7/1949 | (FR) . |
| 1190429 | 10/1959 | (FR) . |
| 1262388 | 4/1961 | (FR) . |

*Primary Examiner*—Allan N. Shoap
*Assistant Examiner*—Niki M. Eloshway

(57) ABSTRACT

A safety pressure release locking gas cap is shown. The gas cap is comprised of a handle element, and a plug element. The plug element is rotatably housed in the handle element, and has external threads. A lock element is contained between the handle element and the plug element and can be used to lock the two components together. Locking arises by rotation of the lock element, for example by a key, about an axis of rotation which is a first manner of movement. The lock element has also a second manner of movement, which is axially along the axis of rotation. Movement in the second manner moves a valve from a pressure containing position to a pressure relief position. According to the present invention the movement in the first manner occurs independently from movement in the second manner.

15 Claims, 2 Drawing Sheets

U.S. PATENT DOCUMENTS

| | | |
|---|---|---|
| 4,529,099 | 7/1985 | Zerrer . |
| 4,579,244 | 4/1986 | Fukuta . |
| 4,676,390 | 6/1987 | Harris . |
| 4,712,586 | 12/1987 | McCauley et al. . |
| 4,712,703 | 12/1987 | Oddenino . |
| 4,726,488 | 2/1988 | Kasugai . |
| 4,736,863 | 4/1988 | Harris . |
| 4,779,755 | 10/1988 | Harris . |
| 4,785,961 | 11/1988 | Kasugai et al. . |
| 4,787,529 | 11/1988 | Harris . |
| 4,795,050 | 1/1989 | Smith et al. . |
| 4,830,058 | 5/1989 | Harris . |
| 4,887,733 * | 12/1989 | Harris ............................. 220/203.06 |
| 4,892,216 * | 1/1990 | Scott ............................... 220/203.23 |
| 5,000,339 | 3/1991 | Wheat et al. . |
| 5,108,001 | 4/1992 | Harris . |
| 5,183,173 | 2/1993 | Heckman . |
| 5,242,072 * | 9/1993 | Koebernik ...................... 220/203.23 |
| 5,520,300 | 5/1996 | Griffin . |
| 5,667,093 | 9/1997 | Lefevre . |
| 5,845,800 * | 12/1998 | Shaw et al. ......................... 220/210 |

\* cited by examiner

LOCKABLE SAFETY RELEASE GAS CAP

FIELD OF THE INVENTION

This invention relates generally to the field of gas caps of the sort that attach to the mouths of filler tubes of gas tanks, for example, of automobiles. More particularly, this invention relates to gas caps of the type that are lockable to prevent third party access to the gas tank, and include a mechanism to permit vapour pressure built up in the gas tank to be safely vented.

BACKGROUND OF THE INVENTION

Many of our modern devices make use of internal combustion engines. Typically associated with an internal combustion engine, will be a fuel reservoir such as a gas tank. In many applications, unwanted third party access to the gas tank is to be prevented. Therefore, especially in the automotive field, there have been developed what are generally referred to as lockable gas caps.

A lockable gas cap is a gas cap which includes a plug element, for plugging the filling tube of the gas tank, and, a handle element which may be gripped to remove the plug element from the mouth of the filling tube. Typically, a lock is mounted between the handle and the plug element for selectively locking the two components together. Thus, when the handle is locked to the plug element, the handle and the plug element may be rotated together, and therefore, the plug may be removed from the mouth of the filler tube. Similarly, where the lock is disengaged, the handle will be free to rotate relative to the plug element. Where the plug element for example is threaded into the filler tube, without an operative or drive connection between the handle and the plug element, the plug element cannot be removed from the filler tube. This therefore prevents unwanted third party access to the filler tube and attendant gas tank.

Under vehicular codes, there is a requirement that the gasoline storage tanks of automobiles and the like be made vapour tight to prevent the escape of gas vapours into the atmosphere. Typically, the requirement is that the gas tank be capable of withstanding pressure build up of at least one half an atmosphere above ambient pressure conditions. Such a pressure build up can be hazardous. More particularly, upon removal of a plug element from a pressurized gas tank, there is a risk of a rush of gas vapour and liquid, which can spill onto the person removing the gas cap. Gasoline may then come into contact with clothing and skin, which is less than ideal. Gasoline, being highly flammable, should not be allowed to soak a person's clothes. Also, staining is a problem.

To overcome this problem, some manufacturers have developed pressure release mechanisms associated with their locking gas caps. For example, U.S. Pat. No. 5,520,300 shows a lockable pressure relief fuel cap in which the pressure relief mechanism is associated with the locking mechanism. However, the means for actuating the vent, to release the overpressure in the fuel tank, operates only in response to movement of the lock from the locked position to the unlocked position. In other words, during the act of unlocking, the internal mechanism of this prior gas cap, causes a vent to open, to create a pressure release. This invention therefore includes a complicated series of posts, ramps and biasing elements to effect the translation of rotational movement into vent release movement. This is somewhat complicated and expensive to implement because of the number of parts required.

Other solutions, include a lockable pressure release mechanism for a radiator cap for a vehicle engine such as shown in U.S. Pat. No. 3,945,454. Radiator caps are substantially different from gas caps, and therefore are constructed according to different standards. Most particularly, radiator caps must stand significantly greater pressure build ups than one half of one atmosphere above ambient, which is the design level for gas caps.

U.S. Pat. No. 3,945,454, shows a radiator cap having a locking element which is a combination locking and unlocking device and pressure release device. However, according to this prior patent it is necessary, once the key is inserted to depress the key cylinder in the radiator cap sufficiently to permit a locking pin 41 to move a slider into locking engagement. The locking engagement connects the plug element to the handle element. Turning the key in the lock cylinder, without axial movement of the lock cylinder results in the locking pin idly turning and no locking engagement being made. This patent teaches that the lock cylinder must be moved axially a predetermined amount in order to lock the plug element to the handle. A pressure relief valve is located so that the valve is open when the locking element is moved axially enough to lock the plug element and the handle together.

Of course, in a radiator cap environment, where significant pressures are built up behind the cap, requiring a predetermined amount of axial movement of the lock cylinder, in order to open the valve a predetermined amount, is required. In the absence of such a requirement, a user would likely not provide sufficient force to act against the pressure built up within the radiator, to cause a pressure relief prior to removing the cap. Failing to adequately relieve the pressure prior to removing the radiator cap, could result in hot radiator fluid spewing out over the person removing the cap which is both unsafe and undesirable. However, requiring the movement of the locking element to be connected to the movement of the valve for the pressure release, requires extra components, and is complicated and expensive to implement.

| | | |
|---|---|---|
| Lefevre | U.S. Pat. No. 5,667,093 | Issue Date September 16, 1997 |
| Wheat et al. | U.S. Pat. No. 5,000,339 | Issue Date March 19, 1991 |
| Fukuta | U.S. Pat. No. 4,579,244 | Issue Date April 1, 1996 |

SUMMARY OF THE INVENTION

What is desired is an inexpensive way to reliably provide pressure relief for a gas tank, while at the same time providing a reliable locking and unlocking mechanism for a lockable gas cap. Most preferably, the pressure relief mechanism and locking mechanism should be simply and elegantly configured, with a minimum of extra parts and requirements on the part of the user. Also, it should provide a safe pressure release reliably, without any extra effort on the part of the user. What is desired is to make the pressure release step essentially invisible to the user. Therefore, there is provided according to the present invention, a lockable gas cap for closing the mouth of a filling tube of a gas tank, the filling tube having internal threads, the gas cap comprising:

a plug element having external threads sized and shaped to engage the internal threads of the filling tubes;

a handle element mounted on said plug element; and a lock movably housed in said plug element, said lock having a first and a second manner of movement within said plug element, said first manner of movement being between a locked and an unlocked position, and said second manner of movement being between a pressure containing and a pressure release position
wherein said first manner of movement is independent from said second manner of movement.

BRIEF DESCRIPTION OF THE DRAWINGS

There is provided a preferred embodiment of the present invention, by way of example only, which is illustrated in the following drawings.

DETAILED DESCRIPTION OF THE PREFERRED EMBODIMENTS

Figure 1:
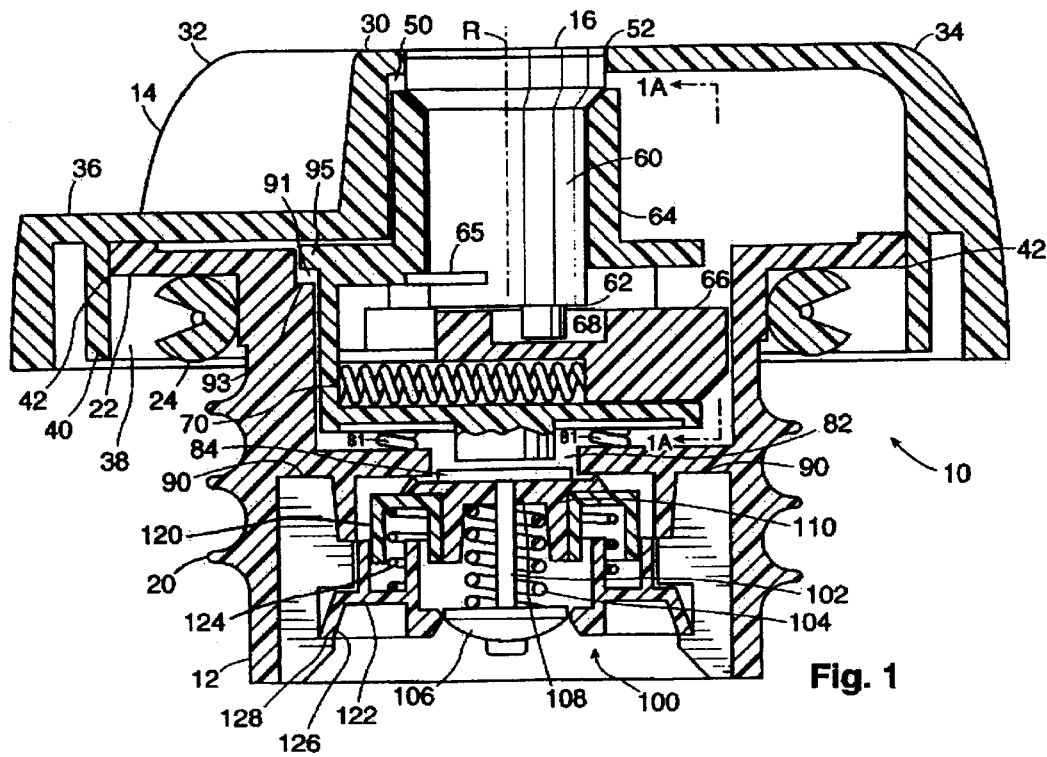
FIG. 1 is a side view of a safety release locking gas cap according to the present invention.

A lockable gas cap for closing the mouth of a filling tube of a gas tank according to the present invention is shown generally at 10 in FIG. 1. The lockable gas cap 10 includes a plug element 12 and a handle element 14. The handle element 14 is rotatably mounted to the plug element 12 to form a gas cap assembly. A lock is housed in the assembly formed by the plug element 12 and the handle element 14. The interrelationship of these various components is described in more detail below.

The plug element 12 is generally tubular, and includes external threads 20. Formed at the upper end of external threads 20 is an outwardly extending lip 22. Located at the corner of the outwardly extending lip 22 and the threaded portion 20 is a split O-ring gasket 24. It will be appreciated by those skilled in the art, that when the plug element 12 is threadably engaged with the mouth of a filler tube of a gas tank, the plug element 12 is threaded into the tube until the upper end of the tube engages the split O-ring gasket 24 to provide a vapour tight seal.

The handle element 14 includes a top portion 30 which has a pair of laterally extending wings 32, 34, as well as an overhanging portion 36. The wings 32, 34 act as finger or hand holds, to permit the handle element to be grabbed and rotated about a central axis.

The overhanging portion 36 is formed with a downwardly opening chamber, indicated as 38. The chamber 38 is sized and shaped to receive the outwardly extending lip 22 of the plug element 12. The downwardly extending chamber 38 is formed by a skirt or wall 40 which includes a plurality of tabs 42. It can now be appreciated that the plug element 12 is inserted into the opening 38 and pushed past tabs 40, which thereafter retain the plug element 12 in the handle element 14. This snap fit connection is accomplished with a small gap, so that the handle 14 can be rotated relative to the plug element 12 in the absence of any other intervening connecting structure.

It will be appreciated that the handle element 14 and the plug element 12 can be made from plastics, such as by injection molding, but that if so, the plastic must be suitably gas and fuel resistant as is known in the art.

Turning to the lock element 16, it can now be appreciated that the lock element 16 is contained in a chamber 50 formed in between the handle element 14 and the plug element 12. The chamber 50 includes a top opening 52 sized and shaped to closely receive the lock element 16. Lock element 16 is comprised of a number of components which together form an assembly. As shown in FIG. 1, there is the key cylinder 60 with actuator 62. The key cylinder 60 is carried in a housing 64. A key 65 connects the key cylinder 60 to the housing 64. The key 65 permits the key cylinder 60 to rotate about an axis of rotation R relative to the housing 64 but prevents the key cylinder 60 moving axially (or in FIG. 1, up and down) relative to the housing 64.

Also shown in the housing 64 is a locking cam 66 having a slot 68 for the actuator 62. A biasing element 70 extends between an inside wall of the housing 64 and a part of the locking cam 66. It can now be appreciated, that as the key cylinder 60 is rotated, for example, by inserting a key and turning the same, actuator 62 moves to the left, driving locking cam 66 also to the left, against the spring 70. In this configuration, the locking cam 66 disengages from a groove (not shown) formed in the handle element 14. This, is the locked position for the gas cap 10, in which the handle element 14 freely rotates relative to the plug element 12 preventing the plug element 12 from being unscrewed from the filler tube.

Although not shown, the locking cam 66 includes a sloped leading edge, which fits into the groove in the handle element 14. This, acts as an over tightening preventer. If too much torque is applied to the sloped surface, it will cause the cam 66 to slide out the side of the groove, against spring 70. In this manner over tightening is prevented.

In the position shown in FIG. 1, the cam 66 engages a groove in the handle element 14 locking the handle element 14 to the plug element 12. This may be referred to as the gas cap unlocking position, in which it is possible to remove the gas cap from the mouth of the filler tube. There is no cam surface when rotating in this direction, ensuring that the handle element 14 does not slip relative to the plug element 12 when unscrewing the gas cap 10.

Also associated with the housing 64 is a thrust actuator 80. Thrust actuator 80 extends downwardly from the housing 64 and through an opening 82 formed in the plug element 12. The thrust actuator 80 is maintained in position by a first biasing means 81 (in the form of springs) located between housing 64 and the bridge 90 of plug element 12. Also shown is a gap 79 between housing 64 and plug element 12. It will be appreciated that the housing 64 is movable axially against biasing elements 81, by reason of gap 79 and a gap 91 between a shoulder 93 of the plug element 12 and tab 95 of the housing 64.

It is now appropriate to discuss the pressure relief mechanism indicated generally at 100. The pressure relief mechanism has two modes of operation as will be described below.

The first mode is a conventional pressure release device which includes a piston 102 and the spring 104. The spring 104 extends between a cap element 106 and a spring seat 108. The spring 104 urges the underside of thrust element 84 into tight sealing engagement with a rubber gasket 110. Upon an over pressure situation arising below the plug element 12, compression of the spring 104 takes place, driving piston 102 upwardly, and permitting pressure to vent around the piston element, between the piston element 102 and the rubber gasket 110 under the cap. The spring 104 is chosen with an appropriate spring constant K to vent at one half atmosphere pressure over ambient. In a sense, this pressure release is automatic and will occur whenever the maximum allowable pressure is exceeded.

In addition, a second pressure relief mechanism exists. This is the safety pressure relief according to the present invention which is not automatic but rather is manually activated.

More specifically, the pressure assembly 100 further comprises a floating member 120 which is supported above a fixed member 122 by a second biasing means 124 (which is in the form of a spring). The fixed member 122 is snapped into fixed engagement with the plug element 12, by means of angled skirt 126 and an engaging lip 128. The floating member 120 carries the gasket 110 previously described as well as the conventional pressure release mechanism.

Figure 2:
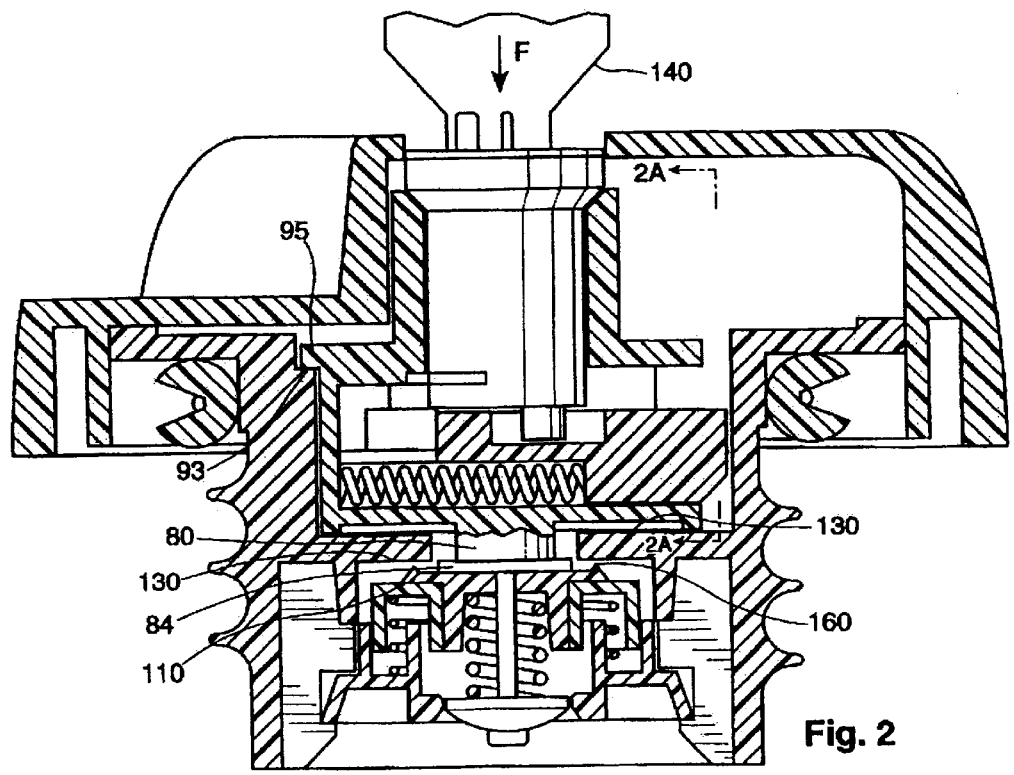
FIG. 2 is a side view of the gas cap of FIG. 1 showing a key being inserted into a lock cylinder.
Figure 1A:
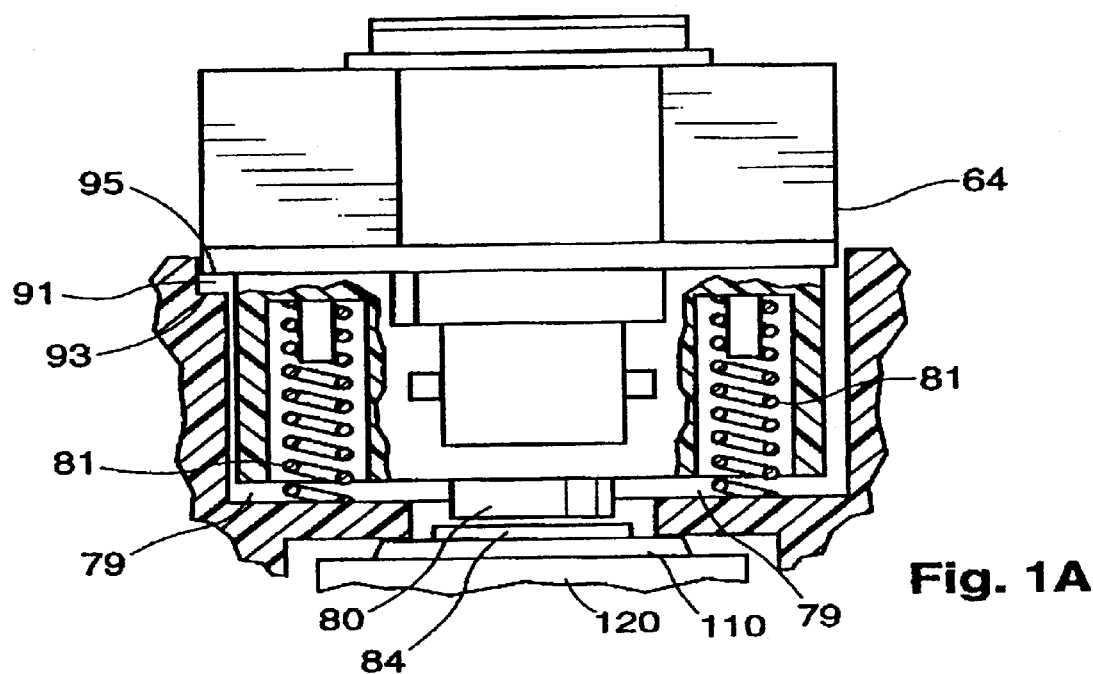
FIG. 1(a) is a view along arrows 1(a) of FIG. 1.
Figure 2A:
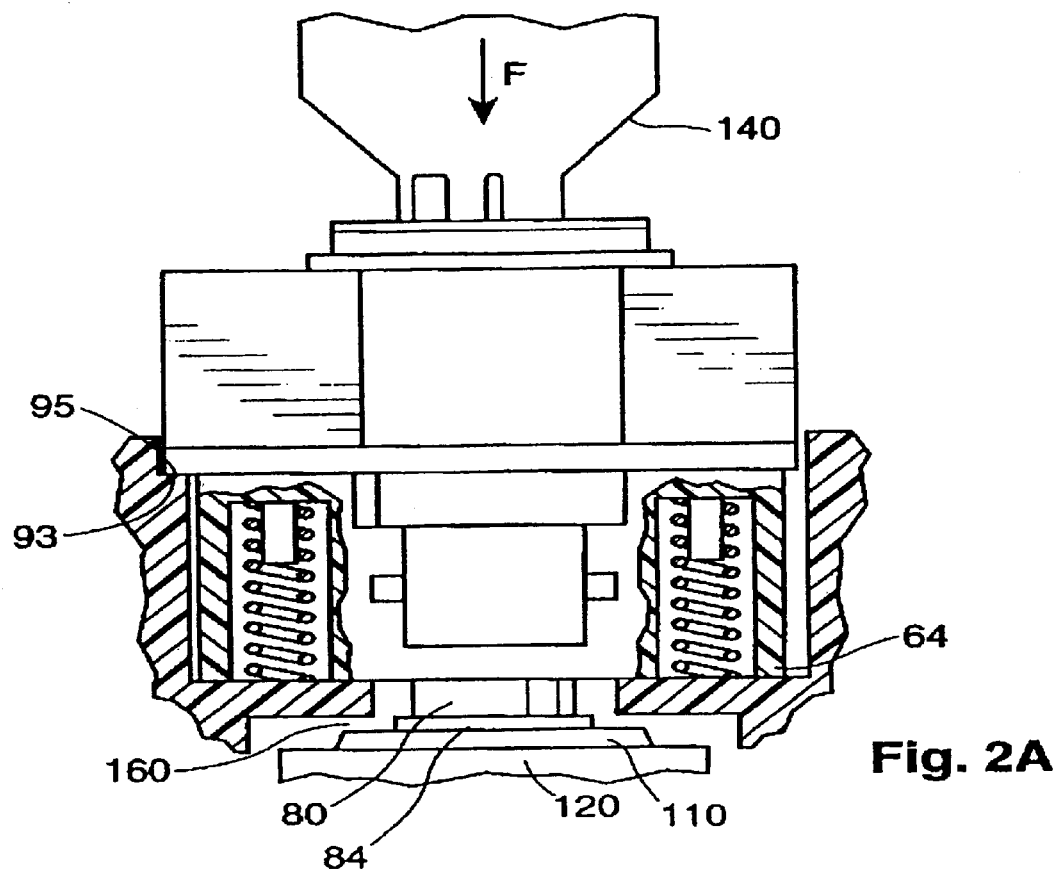
FIG. 2(a) is a view along arrows 2(a) of FIG. 2.

Turning to FIG. 2, the operation can now be understood. Upon a force being applied to the outside surface of lock cylinder 16, indicated by arrow F (generally axially along the axis of rotation R) and exemplified by the insertion of a key 140, lock cylinder 16 together with housing 64 moves downwardly compressing springs 81. It will be noted that no gap 91 is shown in FIG. 2 between tab 95 and shoulder 93. In this way, thrust actuator 80 contacts thrust element 84 pushing gasket 110 away from a valve seat 130 to form pressure release gap 160.

Turning to FIG. 1(*a*), the foregoing can be understood in more detail. In the sealed position, of FIG. 1(*a*), gaps 91 and 79 exist between the housing 64, and the plug element 12. No gap exists between the sealing ring 100 and the plug element valve seat 130. However, in the position shown in FIG. 2(*a*), the key cylinder 60 has been depressed moving housing 64 down, against springs 81, causing actuator 80 to engage and displace thrust element 84, in turn against spring 124. Thus, the gaps 91 and 79 are closed, but pressure release gap 160 is opened. Most preferably the force required should be low to cause the safety pressure release and in the order of 200 to 500 Newtons. Also, the pressure relief is most preferably provided with a minimum of movement, such as 1 to 5 millimetres, most optimally about 2 to 3 millimetres. A low force requirement is preferred, because then the pressure release will likely occur as the key 140 is inserted, even before turning commences. A small amount of movement is preferred, because all that is necessary is to slightly unseat the valve 130, to have an effective pressure relief.

It will be appreciated that the floating housing 64, has a first range of movement defined by the gaps 91 and 79, and limited by the smaller of these gaps. The floating member 120 has a second range of movement, defined at one end by the sealing ring 100 engaging the valve seat 130. These ranges of movements overlap, so that before the end of the first range of movement downwardly, the thrust actuator 80 contacts the thrust element 84, and moves it at least slightly, before reaching the end of the first range of movement. At the end of the first range of movement, the sealing ring 100 is off the valve seat 130, which is the pressure release position.

It can now be appreciated that the present invention provides a simple and reliable safety pressure release, which is accomplished by making the housing 64, carrying the locking cylinder 60, floating relative to the combined handle and plug element assembly, 14 and 12 respectively. The pressure release will occur, as a matter of course, as the key 140 is inserted into the lock, but is not dependent upon the key. Pressure release can occur by simply pressing on the lock cylinder 60, without a key. Similarly, engaging or disengaging the locking cam 66 to operatively connect or disconnect the handle element 14 to the plug element 12 can be accomplished without regard to pressure release. In practice the force and movement required to provide such pressure release is so small as to typically occur when inserting a key 140 to the key cylinder 60. However, the locking, unlocking step occurs independently of the pressure release step, because each is governed by separate independent movements of the components of the present invention.

When the lockable gas cap 10 according to the present invention is in place, in the mouth of a filling tube, there are two releasable pressure seals that are formed in the floating member 120. One seal is inside the pressure chamber so formed. This is the manually actuable safety release according to the present invention. Since sealing occurs on the inside surface of the chamber, more pressure causes greater sealing. The other seal is the automatic over pressure release seal which is on the outside of the pressure chamber. Thus, over pressure causes the seal to move off the seal seat, after a predetermined pressure build up. It can now be appreciated that the present invention utilizes one sealing gasket 110, which has two sealing ridges. This is efficient, cost effective and simple to implement and provides the present invention with commercial advantages.

It will be appreciated by those skilled in the art that the foregoing description is with respect to a preferred embodiment of the invention, and that various alterations and modifications can be made without departing from the broad scope of the invention as defined in the appended claims. Some of these variations have been discussed above, and others will be apparent to those skilled in the art. For example, while molded plastic is preferred, other materials may also be used. Also, while coil springs are shown, other biasing devices could also be used to achieve the same results.

I claim:

1. A lockable gas cap for closing the mouth of a filling tube of a gas tank, the filling tube having internal threads, the gas cap comprising:

a plug element having external threads sized and shaped to engage the internal threads of the filling tube;

a handle element mounted on said plug element; and a lock movably housed in a floating housing between said plug element and said handle element, said lock including a first biasing element, and said lock having a first and second manner of movement within said gas cap, said first manner of movement being between a locked and an unlocked position, and said second manner of movement being between a pressure containing and a pressure release position;

a floating pressure release assembly, said pressure release assembly being manually moveable between a pressure containing position and a pressure release position; and a second biasing element;

wherein said first manner of movement of said lock is independent from said second manner of movement of said lock, said first biasing element biases said floating housing away from said pressure release position, and said second biasing element urges said pressure release assembly into the pressure containing position.

2. A lockable gas cap as claimed in claim 1 wherein said floating housing indicates a thrust actuator, and said floating pressure release assembly includes a thrust surface, the thrust actuator being urged away from the thrust surface by said first biasing element.

3. A lockable gas cap as claimed in claim 2 wherein said floating housing has a first range of movement and said floating pressure release assembly has a second range of movement, wherein said first range of movement over laps said second range of movement sufficiently to permit the thrust actuator to contact and move said thrust surface.

4. A lockable gas cap as claimed in claim 3 wherein said floating pressure release assembly includes an elastomeric seal, said seal being urged against a seat by said second biasing element.

5. The lockable gas cap as claimed in claim 4 wherein a pressure build up in said gas tank urges said seal of said floating pressure release assembly into tighter sealing engagement with said valve seat.

6. The lockable gas cap as claimed in claim 5 wherein said floating pressure release assembly includes an over pressure release element, and said over pressure release element is opened by a predetermined pressure build up in said gas tank.

7. The lockable gas cap as claimed in claim 1 wherein said handle element and said plug element are formed from injection molded plastic.

8. The lockable gas cap as claimed in claim 7 wherein said plug element is snap fit into said handle element.

9. The lockable gas cap as claimed in claim 7 wherein said plug element is rotatably snap fit into said handle element.

10. The lockable gas cap as claimed in claim 1 wherein said plug element carries a pressure release assembly, said pressure release assembly including a manually actuable safety release seat formed on an inside of a pressure chamber formed by said plug element, and an automatic safety pressure release seal formed on an outside of said pressure chamber formed by said plug element.

11. A lockable gas cap for closing the mouth of a filling tube of a gas tank, the filling tube having internal threads, the gas cap comprising:
   a plug element having external threads sized and shaped to engage the internal threads of the filling tube;
   a handle element mounted on said plug element; and
   a lock movably housed in a floating housing between said plug element and said handle element, said lock having a first and second manner of movement within said gas cap, said first manner of movement being between a locked and an unlocked position, and said second manner of movement being between a pressure containing and a pressure release position;
   a first biasing structure which biases said floating housing away from said pressure release position; and
   wherein said first manner of movement of said lock is independent from said second manner of movement of said lock, said first manner of movement is rotational movement about an axis of rotation initiated by a key, and said second manner of movement is axial movement, along said axis of rotation, initiated by any force along said axis of rotation sufficient to compress said first biasing structure.

12. The lockable gas cap as claimed in claim 11 wherein said lock element includes a spring, and a locking cam, said spring urging said locking cam into locking engagement between said handle element and said plug element.

13. The lockable gas cap as claimed in claim 12 wherein said locking cam includes a cam face, which, upon over tightening torque occurring, causes the locking cam to withdraw from the plug element to permit slip between said handle element and said plug element.

14. A lockable gas cap for closing the mouth of a filling tube of a gas tank, the filling tube having internal threads, the gas cap comprising:
   a plug element having external threads sized and shaped to engage the internal threads of the filling tube;
   a handle element mounted on said plug element;
   a pressure release assembly carried by said plug element, said pressure release assembly including a manually actuable safety release seat formed on an inside of a pressure chamber formed by said plug element, and an automatic safety pressure release seal formed on an outside of said pressure chamber formed by said plug element; and
   a lock movably housed in a floating housing between said plug element and said handle element, said lock having a first and second manner of movement within said gas cap, said first manner of movement being between a locked and an unlocked position, and said second manner of movement being between a pressure containing and a pressure release position in which said floating housing is biased away from said pressure release position, said first manner of movement of said lock being independent from said second manner of movement of said lock;
   wherein when said movable lock is in said pressure containing position, seals are formed at both said manually actuable pressure release seal and at said automatic safety pressure release seal.

15. The lockable gas cap as claimed in claim 14 wherein said seals are formed on the same sealing gasket.

* * * * *